US012316018B2

(12) United States Patent
Kim et al.

(10) Patent No.: US 12,316,018 B2
(45) Date of Patent: May 27, 2025

(54) ANTENNA AND ELECTRONIC DEVICE INCLUDING THE SAME

(71) Applicant: Samsung Electronics Co., Ltd., Suwon-si (KR)

(72) Inventors: Namwoo Kim, Suwon-si (KR); Sungkwan Park, Suwon-si (KR); Jeongho Kang, Suwon-si (KR); Changi Park, Suwon-si (KR); Seunggil Jeon, Suwon-si (KR); Hyunchul Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 381 days.

(21) Appl. No.: 17/845,419

(22) Filed: Jun. 21, 2022

(65) Prior Publication Data

US 2023/0010549 A1 Jan. 12, 2023

Related U.S. Application Data

(63) Continuation of application No. PCT/KR2022/008595, filed on Jun. 17, 2022.

(30) Foreign Application Priority Data

Jul. 6, 2021 (KR) ........................ 10-2021-0088331

(51) Int. Cl.
*H01Q 3/34* (2006.01)
*H01Q 1/20* (2006.01)
*H01Q 1/52* (2006.01)

(52) U.S. Cl.
CPC ................ *H01Q 3/34* (2013.01); *H01Q 1/20* (2013.01); *H01Q 1/526* (2013.01)

(58) Field of Classification Search
CPC ........... H01Q 3/34; H01Q 1/20; H01Q 1/526; H01Q 1/243; H01Q 1/42; H01Q 21/08;
(Continued)

(56) References Cited

U.S. PATENT DOCUMENTS

| | | | |
|---|---|---|---|
| 8,836,587 | B2 | 9/2014 | Darnell et al. |
| 10,389,007 | B1 | 8/2019 | Choi et al. |

(Continued)

FOREIGN PATENT DOCUMENTS

| | | | |
|---|---|---|---|
| KR | 10-2019-0140209 | A | 12/2019 |
| KR | 10-2020-0028256 | A | 3/2020 |

(Continued)

OTHER PUBLICATIONS

International Search Report and the Written Opinion dated Sep. 29, 2022, issued in International Application No. PCT/KR2022/008595.

*Primary Examiner* — Ankur Jain
(74) *Attorney, Agent, or Firm* — Jefferson IP Law, LLP

(57) ABSTRACT

An electronic device is provided. The electronic device includes a housing including a conductive part, a device substrate disposed in an inner space of the housing, an antenna structure, disposed in the inner space to form a directional beam and including a substrate, an array antenna including a plurality of antenna elements disposed on the substrate and a support bracket to support the substrate, an electrical connection member connecting the substrate to the device substrate, a conductive contact connecting the electrical connection member to the conductive part, a first wireless communication circuit disposed in the inner space and configured to transmit or receive a first wireless signal in a first frequency band through the antenna structure, and a second wireless communication circuit disposed on the device substrate and configured to transmit or receive a (Continued)

second wireless signal in a second frequency band through the conductive part.

20 Claims, 10 Drawing Sheets

(58) Field of Classification Search
CPC .... H01Q 21/0025; H01Q 1/1207; H01Q 1/38; H01Q 9/0407
See application file for complete search history.

(56) References Cited

U.S. PATENT DOCUMENTS

| | | | | |
|---|---|---|---|---|
| 2020/0028949 | A1* | 1/2020 | Kim | H01Q 1/38 |
| 2020/0127361 | A1* | 4/2020 | Lee | H01Q 1/2283 |
| 2020/0127404 | A1* | 4/2020 | Seo | H01R 12/79 |
| 2020/0144699 | A1* | 5/2020 | Jeon | H01Q 9/36 |
| 2020/0161763 | A1* | 5/2020 | Lee | H01Q 25/00 |
| 2020/0194879 | A1* | 6/2020 | Lim | H01Q 1/243 |
| 2020/0212539 | A1* | 7/2020 | Yun | H01Q 1/38 |
| 2020/0280131 | A1* | 9/2020 | Avser | H01Q 1/241 |
| 2020/0280133 | A1* | 9/2020 | Avser | H01Q 5/42 |
| 2021/0167487 | A1* | 6/2021 | Varma | H01Q 1/38 |
| 2022/0200640 | A1 | 6/2022 | Kim et al. | |
| 2022/0216613 | A1 | 7/2022 | Jeon | |
| 2022/0352635 | A1* | 11/2022 | Compton | H05K 1/028 |
| 2023/0209701 | A1 | 6/2023 | Bae et al. | |
| 2023/0275625 | A1* | 8/2023 | Kim | H01Q 21/06 455/73 |

FOREIGN PATENT DOCUMENTS

| | | | |
|---|---|---|---|
| KR | 10-2020-0058153 | A | 5/2020 |
| KR | 10-2020-0073745 | A | 6/2020 |
| KR | 10-2021-0017066 | A | 2/2021 |
| KR | 10-2021-0043321 | A | 4/2021 |
| KR | 10-2022-0029158 | A | 3/2022 |
| KR | 10-2022-0077574 | A | 6/2022 |

* cited by examiner

ANTENNA AND ELECTRONIC DEVICE INCLUDING THE SAME

CROSS-REFERENCE TO RELATED APPLICATION(S)

This application is a continuation application, claiming priority under § 365(c), of an International application No. PCT/KR2022/008595, filed on Jun. 17, 2022, which is based on and claims the benefit of a Korean patent application number 10-2021-0088331, filed on Jul. 6, 2021, in the Korean Intellectual Property Office, the disclosure of which is incorporated by reference herein in its entirety.

TECHNICAL FIELD

The disclosure relates to an antenna and an electronic device including the same.

BACKGROUND ART

An electronic device has gradually become slimmer in order to secure competitiveness with other manufacturers, and has been improved so as to increase stiffness, reinforce the design aspect, and differentiate functional elements thereof at the same time.

A plurality of electronic components (e.g., antenna) disposed in an inner space of the electronic device should be efficiently disposed with each other to help slimming of the electronic device. Further, in case that the functions of the plurality of electronic components are unable to be properly manifested even if they are efficiently disposed in the inner space of the electronic device, this may cause the quality of the electronic device to be degraded, and thus there has been a trend of developing the electronic components so as to satisfy such conditions.

The above information is presented as background information only to assist with an understanding of the disclosure. No determination has been made, and no assertion is made, as to whether any of the above might be applicable as prior art with regard to the disclosure.

DISCLOSURE

Technical Problem

An electronic device, such as a mobile terminal, a mobile communication terminal, or a smartphone, may communicate with an external electronic device through a wireless communication circuit and at least one antenna. The electronic device may include a plurality of antennas (e.g., antenna structures) so as to provide different wireless communication functions in various frequency bands. Such antennas may include a legacy antenna operating in a frequency band in the range of about 600 megahertz (MHz) to 6000 MHz and a mmWave antenna operating in a frequency band in the range of about 3 gigahertz (GHz) to 100 GHz. Such antennas operating in different frequency band may be disposed in different spaces of the electronic device, and may be connected to the wireless communication circuit of a substrate through different electrical connection members.

However, individual electrical connection structures of the antennas may cause difficulty in an efficient disposition design and robust design of the electronic device having gradually become slimmer.

Aspects of the disclosure are to address at least the above-mentioned problems and/or disadvantages and to provide at least the advantages described below. Accordingly, an aspect of the disclosure is to provide an antenna having an efficient disposition structure and an electronic device including the antenna.

Another aspect of the disclosure is to provide an antenna and an electronic device including the antenna which can help slimming of the electronic device.

However, the task intended to be solved in the disclosure is not limited to that as described above, but may be variously extended within a range that does not deviate from the idea and scope of the disclosure.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing including a conductive part, a device substrate disposed in an inner space of the housing, an antenna structure disposed in the inner space so as to form a directional beam, the antenna structure including a substrate, an array antenna including a plurality of antenna elements disposed on the substrate, and a support bracket disposed to support the substrate, an electrical connection member electrically connecting the substrate and the device substrate to each other, a conductive contact electrically connecting the electrical connection member and the conductive part to each other, a first wireless communication circuit disposed in the inner space of the housing and configured to transmit or receive a first wireless signal in at least one first frequency band through the antenna structure, and a second wireless communication circuit disposed on the device substrate, and configured to transmit or receive a second wireless signal in at least one second frequency band through the conductive part.

Advantageous Effects

Since the electronic device according to an embodiment of the disclosure includes an improved disposition structure for electrically connecting at least two antennas operating in different frequency bands to a corresponding wireless communication circuit through one electrical connection member, it can help slimming of the electronic device and securing of stiffness of the electronic device through a free location change of a conductive part disposed in at least a part of a housing and used as an antenna through at least one segment part.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
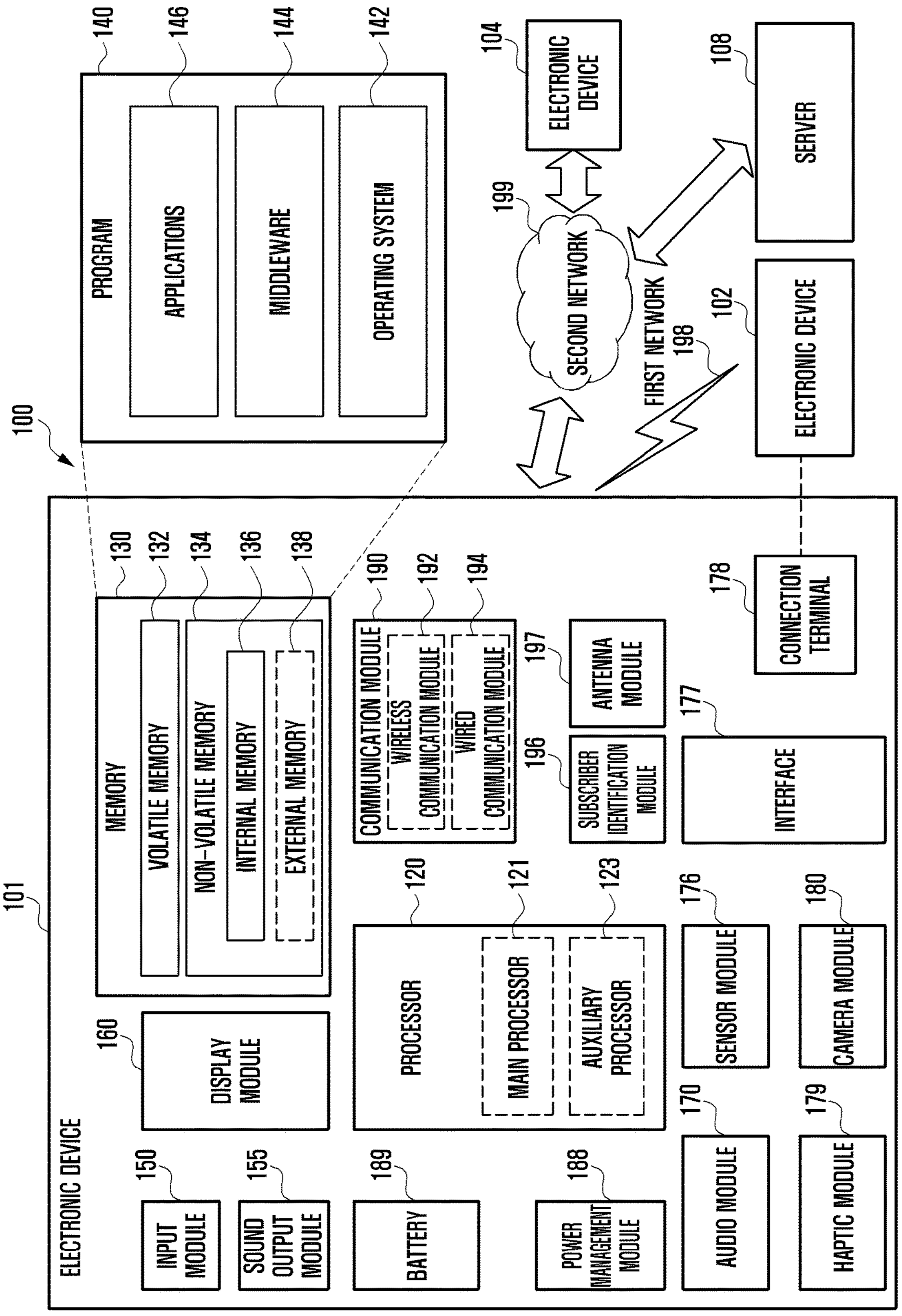
FIG. 1 is a block diagram of an electronic device 101 in a network environment 100 according to an embodiment of the disclosure.

FIG. 1 is a block diagram illustrating an example electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting (or connection) terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ Wi-Fi direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
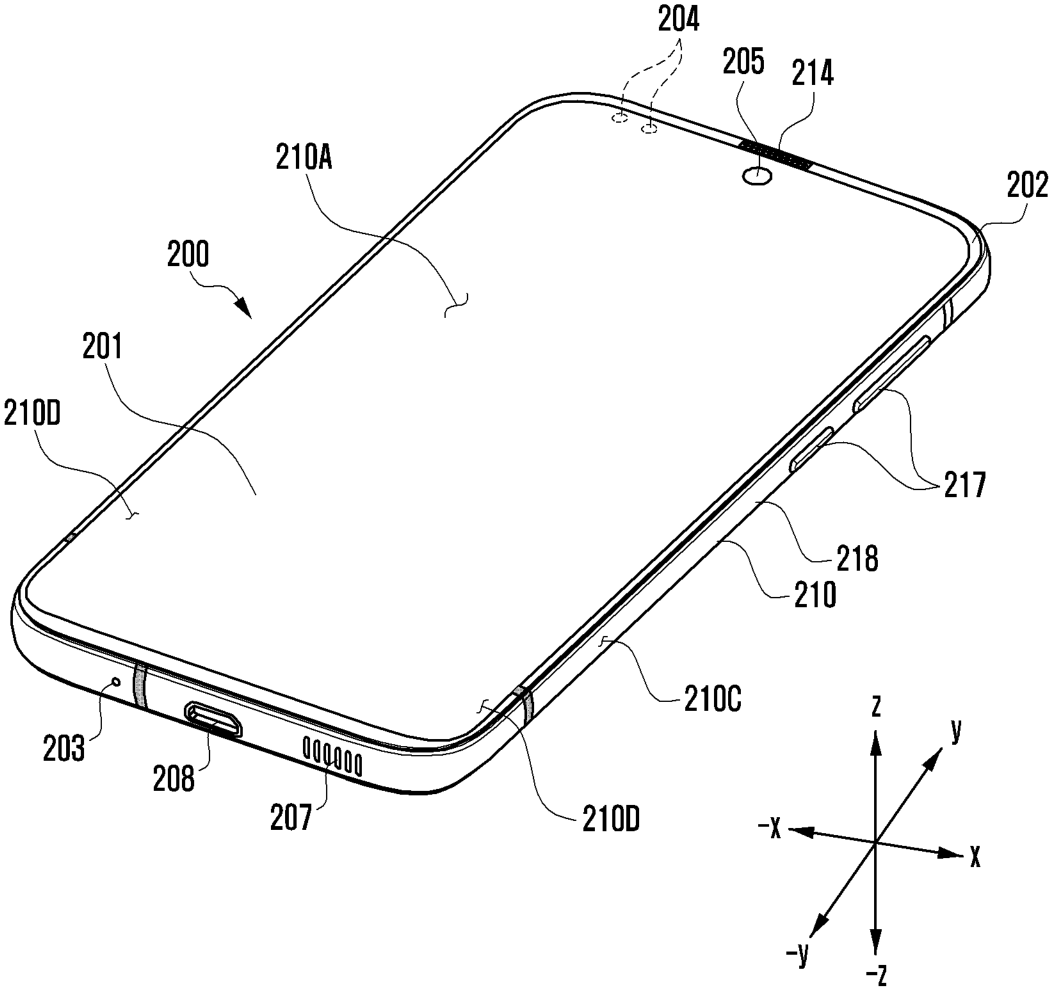
FIG. 2A is a perspective view of an electronic device according to an embodiment of the disclosure.

FIG. 2A illustrates a perspective view showing a front surface of a mobile electronic device 200 according to an embodiment of the disclosure.

Figure 2B:
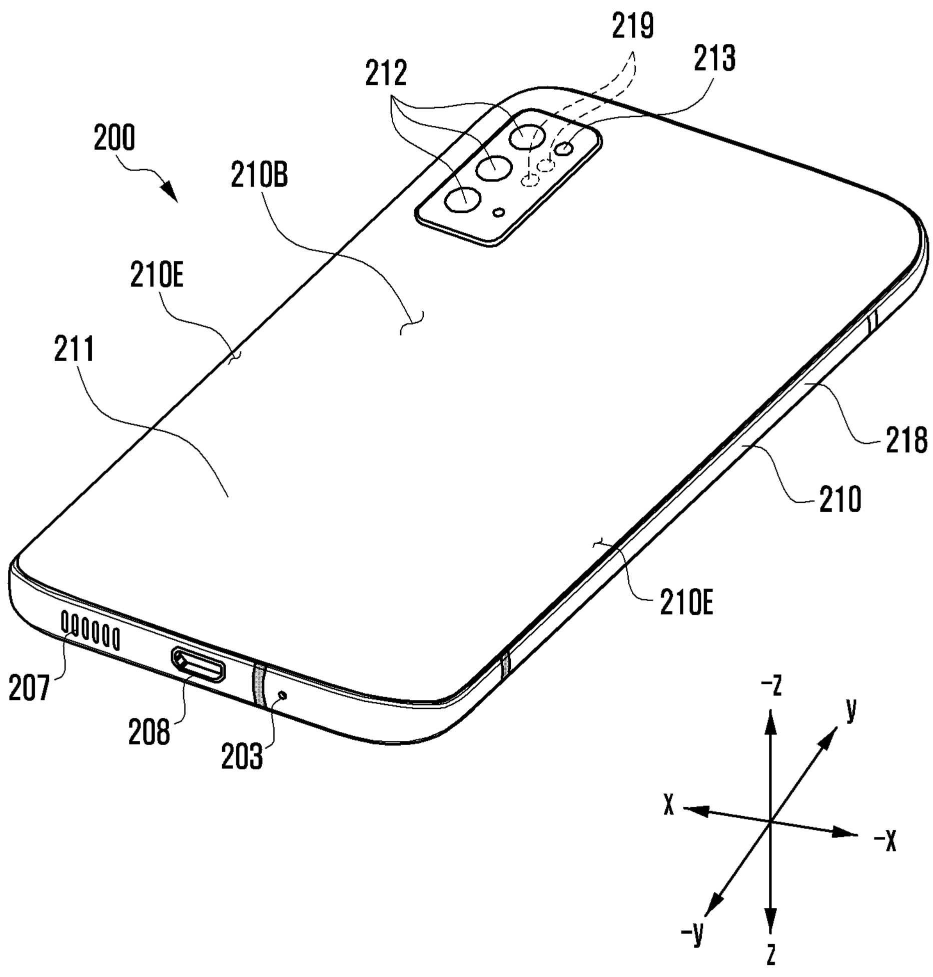
FIG. 2B is a rear perspective view of an electronic device according to an embodiment of the disclosure.

FIG. 2B illustrates a perspective view showing a rear surface of the mobile electronic device 200 shown in FIG. 2A according to an embodiment of the disclosure.

The mobile electronic device 200 in FIGS. 2A and 2B may be at least partially similar to the electronic device 101 in FIG. 1 or may further include other embodiments.

Referring to FIGS. 2A and 2B, the mobile electronic device 200 may include a housing 210 that includes a first surface (or front surface) 210A, a second surface (or rear surface) 210B, and a lateral surface 210C that surrounds a space between the first surface 210A and the second surface 210B. The housing 210 may refer to a structure that forms a part of the first surface 210A, the second surface 210B, and the lateral surface 210C. The first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may be formed of, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

The front plate 202 may include two first regions 210D disposed at long edges thereof, respectively, and bent and extended seamlessly from the first surface 210A toward the rear plate 211. Similarly, the rear plate 211 may include two second regions 210E disposed at long edges thereof, respectively, and bent and extended seamlessly from the second surface 210B toward the front plate 202. The front plate 202 (or the rear plate 211) may include only one of the first regions 210D (or of the second regions 210E). The first regions 210D or the second regions 210E may be omitted in part. When viewed from a lateral side of the mobile electronic device 200, the lateral bezel structure 218 may have a first thickness (or width) on a lateral side where the first region 210D or the second region 210E is not included, and may have a second thickness, being less than the first thickness, on another lateral side where the first region 210D or the second region 210E is included.

The mobile electronic device 200 may include at least one of a display 201, audio modules 203, 207 and 214, sensor modules 204 and 219, camera modules 205, 212 and 213, a key input device 217, a light emitting device, and connector holes 208 and 209. The mobile electronic device 200 may omit at least one (e.g., the key input device 217 or the light emitting device) of the above components, or may further include other components.

The display 201 may be exposed through a substantial portion of the front plate 202, for example. At least a part of the display 201 may be exposed through the front plate 202 that forms the first surface 210A and the first region 210D of the lateral surface 210C. The display 201 may be combined with, or adjacent to, a touch sensing circuit, a pressure sensor capable of measuring the touch strength (pressure), and/or a digitizer for detecting a stylus pen. At least a part of the sensor modules 204 and 219 and/or at least a part of the key input device 217 may be disposed in the first region 210D and/or the second region 210E.

According to certain embodiments, the input device 203 may include at least one microphone. In certain embodiments, the input device 203 may include a plurality of microphones disposed to detect the direction of a sound. According to an embodiment, the audio modules (e.g., sound output devices) 207 and 214 may include speakers. According to an embodiment, the input device 203 may include a receiver for calls disposed in the first housing 210, and a speaker. In certain embodiments, the input device 203, the sound output devices 207 and 214, and the connector port 208 may be disposed in a space arranged in the first housing 210 and/or the second housing 220 of the mobile electronic device 200, and may be exposed to the external environment through at least one hole formed in the first housing 210 and/or the second housing 220. In certain embodiments, the sound output devices 207 and 214 may include a speaker (e.g., piezo speaker) that operates without using a hole formed in the first housing 210 and/or the second housing 220.

The sensor modules 204 and 219 may generate electrical signals or data corresponding to an internal operating state of the mobile electronic device 200 or to an external environmental condition. The sensor modules 204 and 219 may include a first sensor module 204 (e.g., a proximity sensor) and/or a second sensor module (e.g., a fingerprint sensor) disposed on the first surface 210A of the housing 210, and/or a third sensor module 219 (e.g., a heart rate monitor (HRM) sensor) and/or a fourth sensor module (e.g., a fingerprint sensor) disposed on the second surface 210B of the housing 210. The fingerprint sensor may be disposed on the second surface 210B as well as the first surface 210A (e.g., the display 201) of the housing 210. The mobile electronic device 200 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212 and 213 may include a first camera device 205 disposed on the first surface 210A of the mobile electronic device 200, and a second camera device 212 and/or a flash 213 disposed on the second surface 210B. The camera module 205 or the camera module 212 may include one or more lenses, an image sensor, and/or an image signal processor. The flash 213 may include, for example, a light emitting diode or a xenon lamp. Two or more lenses (infrared cameras, wide angle and telephoto lenses) and image sensors may be disposed on one side of the mobile electronic device 200.

The key input device 217 may be disposed on the lateral surface 210C of the housing 210. The mobile electronic device 200 may not include some or all of the key input device 217 described above, and the key input device 217 which is not included may be implemented in another form such as a soft key on the display 201. The key input device 217 may include the sensor module disposed on the second surface 210B of the housing 210.

The light emitting device may be disposed on the first surface 210A of the housing 210. For example, the light emitting device may provide status information of the mobile electronic device 200 in an optical form. The light emitting device may provide a light source associated with the operation of the camera module 205. The light emitting device may include, for example, a light emitting diode (LED), an IR LED, or a xenon lamp.

The connector holes 208 and 209 may include a first connector hole 208 adapted for a connector (e.g., a USB connector) for transmitting and receiving power and/or data to and from an external electronic device, and/or a second connector hole (not shown) adapted for a connector (e.g., an earphone jack) for transmitting and receiving an audio signal to and from an external electronic device.

Some sensor modules 205 of camera modules 205 and 212, some sensor modules 204 of sensor modules 204 and 219, or an indicator may be arranged to be exposed through a display 201. For example, the camera module 205, the sensor module 204, or the indicator may be arranged in the internal space of a mobile electronic device 200 so as to be brought into contact with an external environment through an opening of the display 201, which is perforated up to a front plate 202. According to an embodiment, an area corresponding to some camera module 105 of the display 201 is a part of an area in which content is displayed, and may be formed as a transmission area having designated transmittance. For example, the transmission area may be formed to have transmittance having a range of about 5% to about 20%. The transmission area may include an area overlapped with a valid area (e.g., a field of view (FOV)) of the camera module 105 through which light imaged by an image sensor and for generating an image passes. For example, a transmission area of the display 201 may include an area in which the density of pixels and/or a wiring density are lower than that of surroundings. The camera module 205 may include, for example, under display camera (UDC). In another embodiment, some sensor modules 204 may be arranged to perform their functions without being visually exposed through the front plate 202 in the internal space of the electronic device. For example, in this case, an area of the display 201 facing the sensor module may not require a perforated opening.

Figure 3:
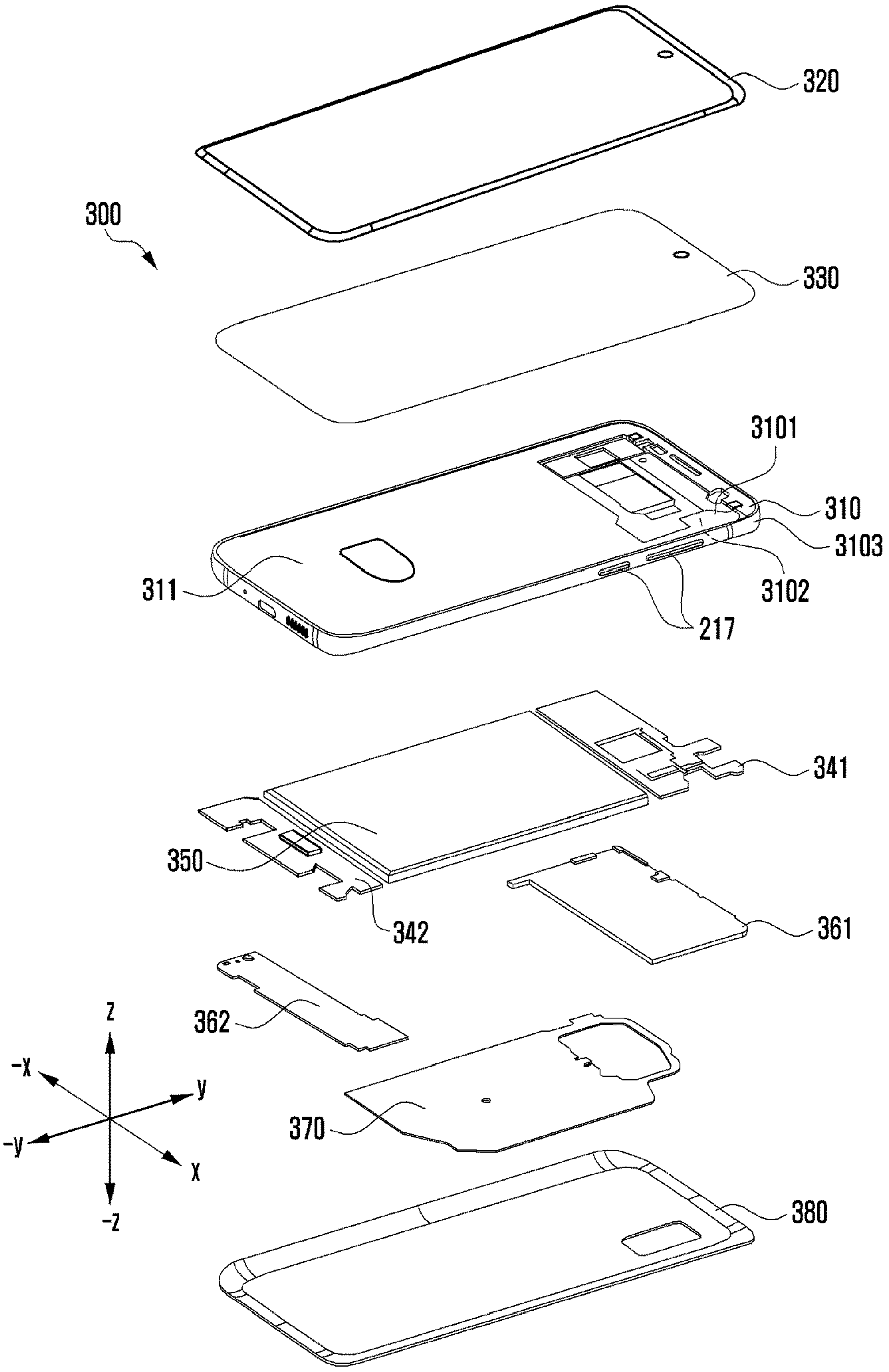
FIG. 3 is an exploded perspective view of an electronic device according to an embodiment of the disclosure.

FIG. 3 illustrates an exploded perspective view showing a mobile electronic device shown in FIG. 2A according to an embodiment of the disclosure.

The electronic device 300 in FIG. 3 may be at least partially similar to the electronic device 101 in FIG. 1 and the mobile electronic device 200 in FIGS. 2A and 2B or may further include other embodiments.

Referring to FIG. 3, a mobile electronic device 300 (e.g., electronic device 101 in FIG. 1) may include a lateral member 310 (e.g., lateral bezel structure 218), a support member 311 (e.g., a bracket or support structure), a front cover 320 (e.g., front plate 202 in FIG. 2A), a display 330 (e.g., display 201 in FIG. 2A), at least one substrate 341 and 342 (e.g., printed circuit board (PCB) or flexible printed circuit board (FPCB)), a battery 350, at least one additional support 361 and 362 (e.g., rear case), an antenna 370, and a rear plate 380 (e.g., rear plate 211). The mobile electronic device 300 may omit at least one (e.g., the support member 311 or the at least one additional support 361 and 362) of the above components or may further include another component. Some components of the electronic device 300 may be the same as or similar to those of the mobile electronic device 101 shown in FIG. 1 or FIG. 2A, and thus, descriptions thereof are omitted below.

According to various embodiments, the lateral member 310 may include a first side 3101 directed in a first direction (e.g., z-axis direction), a second side 3102 directed in an opposite direction to the first side 3101, and a lateral side 3102 surrounding a space (e.g., inner space 4001 of FIG. 4) between the first side 3101 and the second side 3102. According to an embodiment, at least a part of the lateral side 3103 may form an appearance of the electronic device. According to an embodiment, the support member 311 may be disposed to extend from the lateral member 310 toward an inner space (e.g., inner space 4001 of FIG. 4) of the electronic device 300. In a certain embodiment, the support member 311 may be disposed separately from the lateral member 310. According to an embodiment, the lateral number 310 and/or the support member 311 may be formed of, for example, a metal material and/or a non-metal element (e.g., polymer).

According to an embodiment, the support member 311 may be disposed to support at least a part of the display 330 through the first side 3101 and to support the at least one substrate 341 and 342 and/or at least a part of the battery 350 through the second side 3102. According to an embodiment, the at least one substrate 341 and 342 may include the first substrate 341 (e.g., main substrate) disposed on one side and the second substrate 342 (e.g., sub-substrate) disposed on the other side based on the battery 350 in the inner space of the electronic device. According to an embodiment, the first substrate 341 and/or the second substrate 342 may include a processor, a memory, and/or an interface. According to an embodiment, the processor may include, for example, one or more of a central processing unit, an application processor, a graphic processor, an image signal processor, a sensor hub processor, or a communication processor.

According to an embodiment, the memory may include, for example, a volatile memory or a nonvolatile memory.

According to an embodiment, the interface may include, for example, a high definition multimedia interface (HDMI), a universal serial bus (USB) interface, an SD card interface, and/or an audio interface. For example, the interface may electrically or physically connect the electronic device 300 and an external electronic device to each other, and may include a USB connector, an SD card/multimedia card (MMC) connector, or an audio connector. According to an embodiment, the battery 350 is a device for supplying a power to at least one constituent element, and may include, for example, a non-rechargeable primary cell, a rechargeable secondary cell, or a fuel cell.

At least a part of the battery 350 may be disposed on, for example, substantially the same plane as the at least one substrate 341 and 342. According to an embodiment, the battery 350 may be disposed in a manner that it is built in the electronic device 300. In a certain embodiment, the battery 350 may be detachably disposed from the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

In a certain embodiment, the electronic device 300 may further include a digitizer for detecting an external electronic pen.

Figure 4:
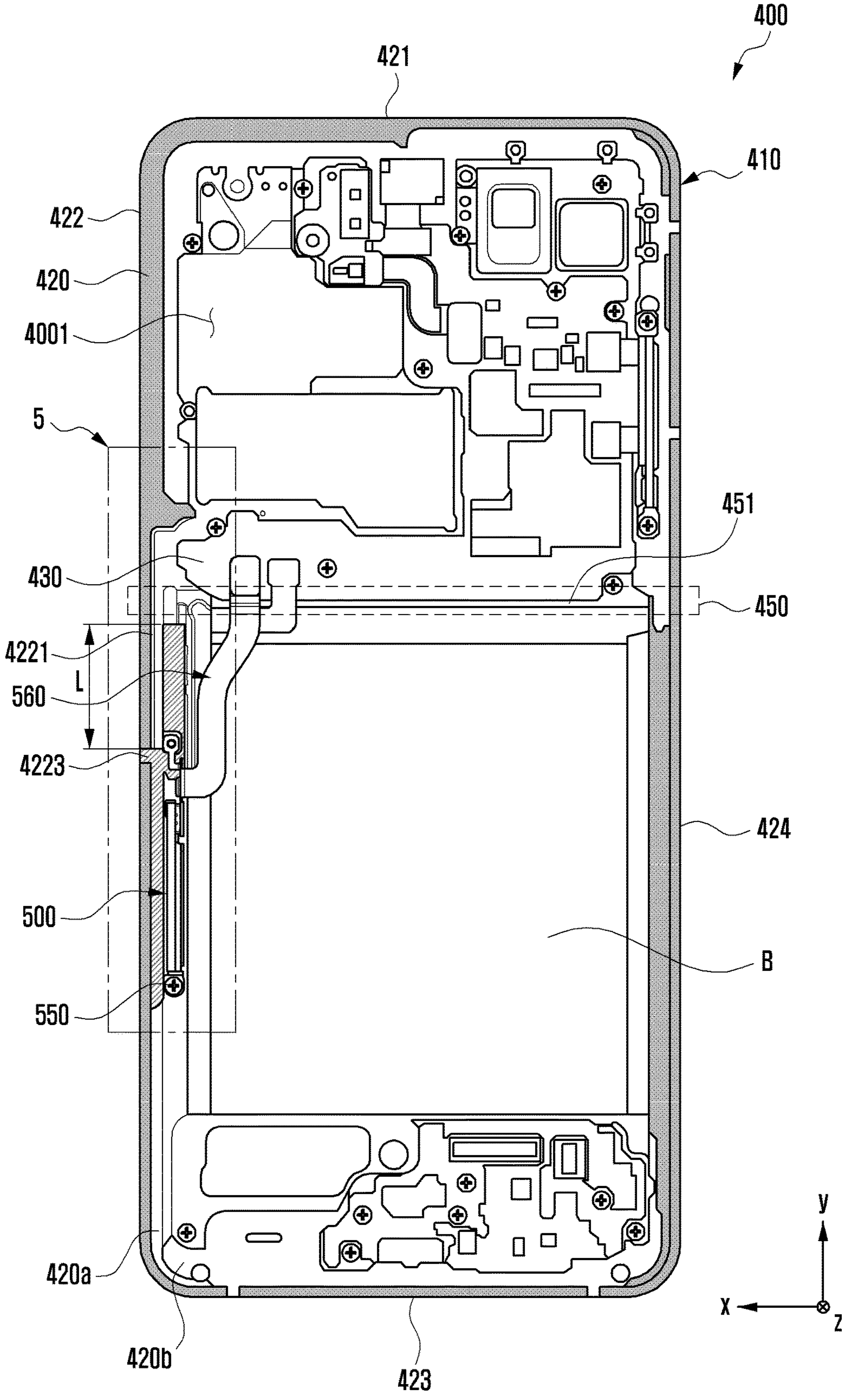
FIG. 4 is a configuration view of an electronic device including an antenna structure and a conductive part according to an embodiment of the disclosure.

FIG. 4 is a configuration view of an electronic device including an antenna structure and a conductive part according to an embodiment of the disclosure.

Figure 5:
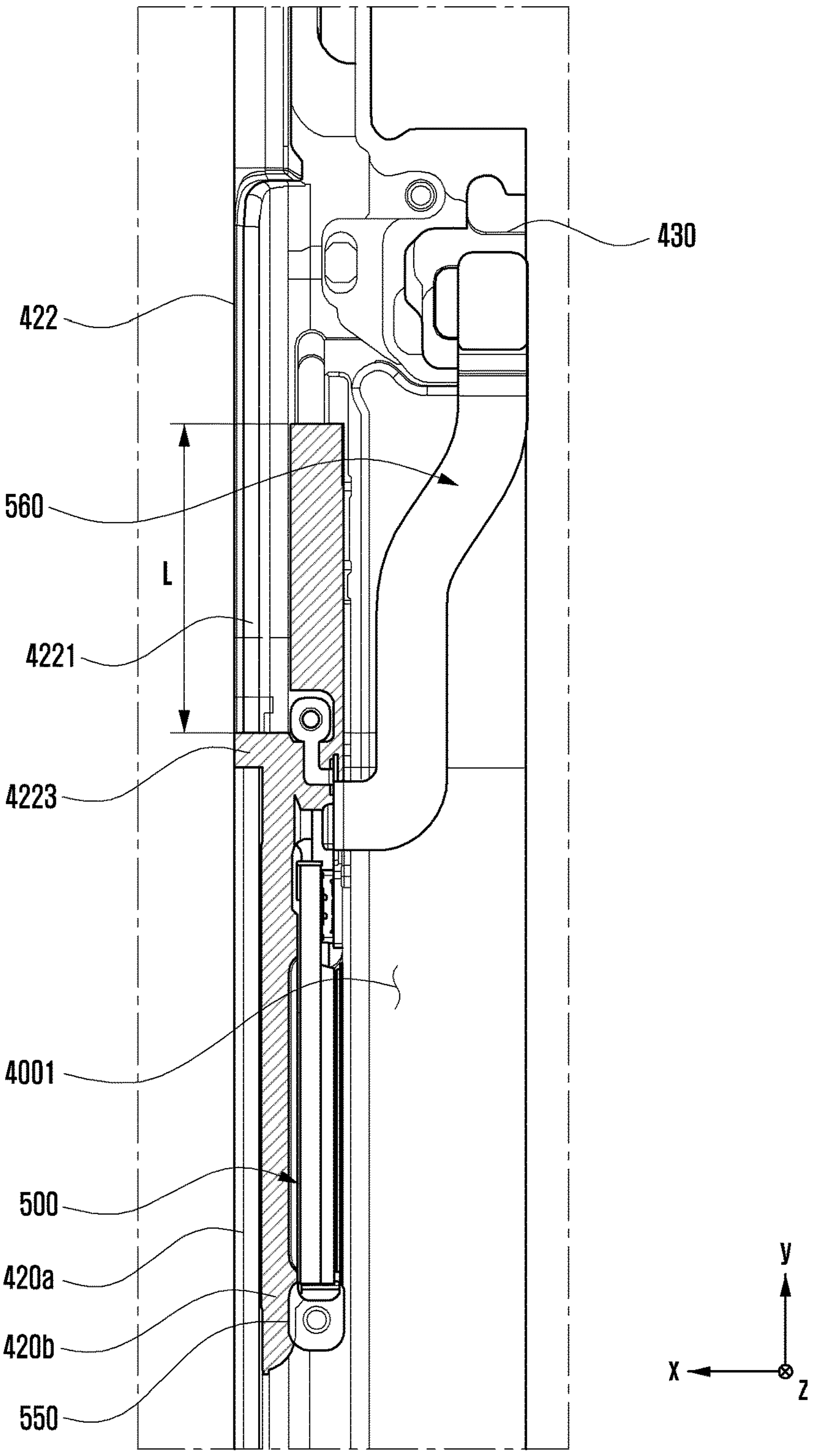
FIG. 5 is an enlarged view of an area 5 of FIG. 4 according to an embodiment of the disclosure.

FIG. 5 is an enlarged view of an area 5 of FIG. 4 according to an embodiment of the disclosure.

An electronic device 400 of FIG. 4 may be at least partly similar to the electronic device 101 of FIG. 1, the mobile electronic device 200 of FIG. 2A, and/or the electronic device 300 of FIG. 3, or may include other embodiments of the electronic device.

Referring to FIGS. 4 and 5, the electronic device 400 (e.g., electronic device 101 of FIG. 1, mobile electronic device 200 of FIG. 2A, and/or electronic device 300 of FIG. 3) may include a housing 410 (e.g., housing 210 of FIG. 2A) (e.g., housing structure) including a front cover (e.g., front plate 202 of FIG. 2A or front cover 320 of FIG. 3) (e.g., first cover or first plate), a rear cover (e.g., rear plate 211 of FIG. 2A or rear cover 380 of FIG. 3) (e.g., second cover or second plate) directed in an opposite direction to the front cover, and a lateral member 420 (e.g., lateral bezel structure 218 of FIG. 2A or lateral member 310 of FIG. 3) surrounding an inner space 4001 between the front cover and the rear cover. According to an embodiment, the lateral member 420 may be at least partly formed of a conductive member 420*a* (e.g., metal material) and a non-conductive member 420*b* (e.g., polymer material). According to an embodiment, the lateral member 420 may be formed in a manner that the non-conductive member 420*b* is injected into the conductive member 420*a*, or is structurally combined with the conductive member 420*a*.

According to various embodiments, the lateral member 420 may include a first side 421 having a first length, a second side 422 extending in a vertical direction from the first side 421 and having a second length that is longer than the first length, a third side 423 extending in a direction parallel to the first side 421 from the second side 422 and having the first length, and a fourth side 424 extending in a direction parallel to the second side 422 from the third side 423 and having the second length.

According to various embodiments, the lateral member 420 at least partly formed of the conductive member 420*a* (e.g., metal material) may include a conductive part 4221 segmented through at least one non-conductive part 4223

(e.g., segment part). In a certain embodiment, the electronic device 400 may include two or more conductive parts segmented through the at least one non-conductive part 4223. According to an embodiment, the electronic device 400 may include the conductive part 4221 disposed through the non-conductive part 4223 (e.g., segment part) disposed on at least a part of the second side 422. In a certain embodiment, the electronic device 400 may further include at least one conductive part disposed in substantially the same manner on at least one side among the first side 421, the third side 423, or the fourth side 424 of the lateral member 420. In a certain embodiment, the conductive part 4221 may be separately disposed through two or more non-conductive parts (e.g., segment parts) spaced apart at designated intervals.

According to various embodiments, the electronic device 400 may include an antenna structure 500 disposed in the inner space 4001. According to an embodiment, the antenna structure 500 may include an array antenna (e.g., array antenna AR of FIG. 6A) including a plurality of antenna elements (e.g., a plurality of antenna elements 511, 512, 513, 514, and 515 of FIG. 6A), and may be disposed to form a beam pattern in a direction (e.g., x-axis direction) directed by the second side 422 and/or in a direction (e.g., −z-axis direction) directed by the rear cover. According to an embodiment, the antenna structure 500 may be fixed to at least a part of the lateral member 420 through a support bracket 550. For example, a corresponding area of the lateral member 420 corresponding to the antenna structure 500 disposed in the inner space 4001 of the electronic device 400 may be at least partly formed of the non-conductive member 420*b* to form the beam pattern out of the electronic device 400.

According to various embodiments, the electronic device 400 may include a device substrate 430 (printed circuit board (PCB)) (e.g., first substrate 341 of FIG. 3 and/or second substrate 342 (e.g., printed circuit board or main substrate) disposed in the inner space 4001. According to an embodiment, the device substrate 430 may include at least one wireless communication circuit (e.g., wireless communication module 192 of FIG. 1) or a feeding part. According to an embodiment, the device substrate 430 may be electrically connected to the antenna structure 500 through an electrical connection member 560 according to an embodiment of the disclosure. According to an embodiment, the device substrate 430 may be electrically connected to the conductive part 4221 through at least a part of the electrical connection member 560.

According to various embodiments, at least one wireless communication circuit (e.g., wireless communication module 192 of FIG. 1) may include a first wireless communication circuit (e.g., wireless communication module 192 of FIG. 1) connected to the antenna structure 500 through the electrical connection member 560 and a second wireless communication circuit (e.g., wireless communication module 192 of FIG. 1) connected to the conductive part 4221 through the electrical connection member 560. According to an embodiment, the first wireless communication circuit (e.g., wireless communication module 192 of FIG. 1) may be configured to transmit or receive a wireless signal in at least one first frequency band through the antenna structure 500. According to an embodiment, the second wireless communication circuit (e.g., wireless communication module 192 of FIG. 1) may be configured to transmit or receive a wireless signal in at least one second frequency band through the conductive part 4221. According to an embodiment, the at least one first frequency band may include a frequency band (e.g., NR band or mm Wave band) in the range of about 3 GHz to 100 GHz. According to an embodiment, the at least one second frequency band may include a frequency band (e.g., legacy band) in the range of about 600 MHz to 6000 MHz. According to an embodiment, the electrical connection member 560 may include a flexible printed circuit board (FPCB). According to an embodiment, the electrical connection member 560 may include a flexible radio frequency (RF) cable (FRC).

According to various embodiments, the electronic device 400 may include a battery B (e.g., battery 350 of FIG. 3). In the electronic device 400 according to an embodiment, deformation due to an external impact may occur most vulnerably in a boundary part 450 between an area where the battery B is disposed and an area where the battery B is not disposed. This is caused by a case where a difference in robust structure between the battery having the robust structure and its surrounding area occurs most severely. Accordingly, the antenna structure 500 according to an embodiment of the disclosure may be disposed at a location overlapping the battery B as seen from an outside of the second side 422. Further, the deformation vulnerable non-conductive part 4223 may be disposed in an area overlapping at least a part of the battery B to avoid an area overlapping an edge 451 of the battery B as seen from an outside of the second side 422, and thus deformation or damage of the electronic device 400 caused by the non-conductive part 4223 can be reduced. Further, since the non-conductive part 4223 is disposed close to a location that is adjacent to the feeding part of the antenna structure 500 operating in the first frequency band through one electrical connection member 560 in a state where its location change is limited through preferential disposition of another electronic component (e.g., camera module (e.g., camera module 212 of FIG. 2B)), it may help securing of a sufficient electrical length L of the conductive part 4221. According to an embodiment, the electrical length L may include a distance from a feeding location of the conductive part 4221 near the non-conductive part 4223 to a part of the conductive part 4221, being electrically connected to ground.

According to an embodiment of the disclosure, since the antenna structure 500 and the conductive part 4221 are electrically connected to the device substrate 430 through one electrical connection member 560, the number of parts is reduced, and a wiring structure for antenna connection is simplified to help slimming of the electronic device 400. Further, since the disposition location of the at least one non-conductive part (e.g., non-conductive part 4223) is induced even near the antenna structure 500, it is easy to avoid the stiffness vulnerable part, and the non-conductive part can help securing of the electrical length L of the conductive part 4221.

Hereinafter, a connection structure among the electrical connection member 560, the antenna structure, and the conductive part will be described in detail.

Figure 6A:
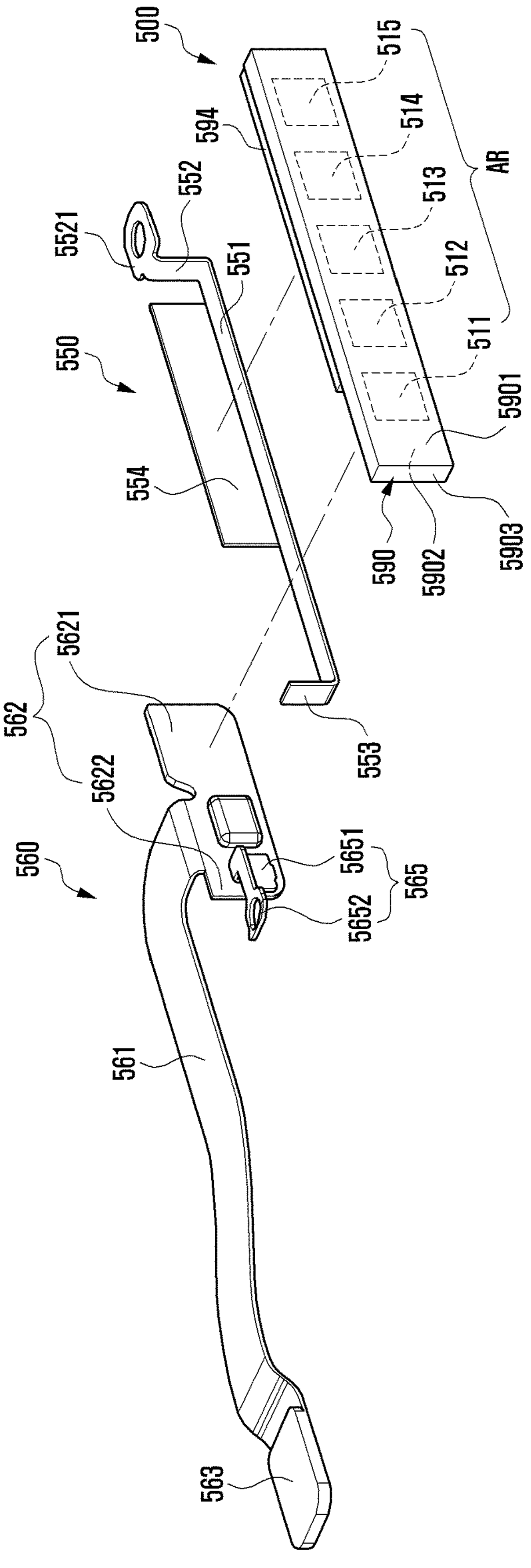
FIG. 6A is a view illustrating an antenna structure and an electrical connection member in a separated state according to an embodiment of the disclosure.

FIG. 6A is a view illustrating an antenna structure and an electrical connection member in a separated state according to an embodiment of the disclosure.

Figure 6B:
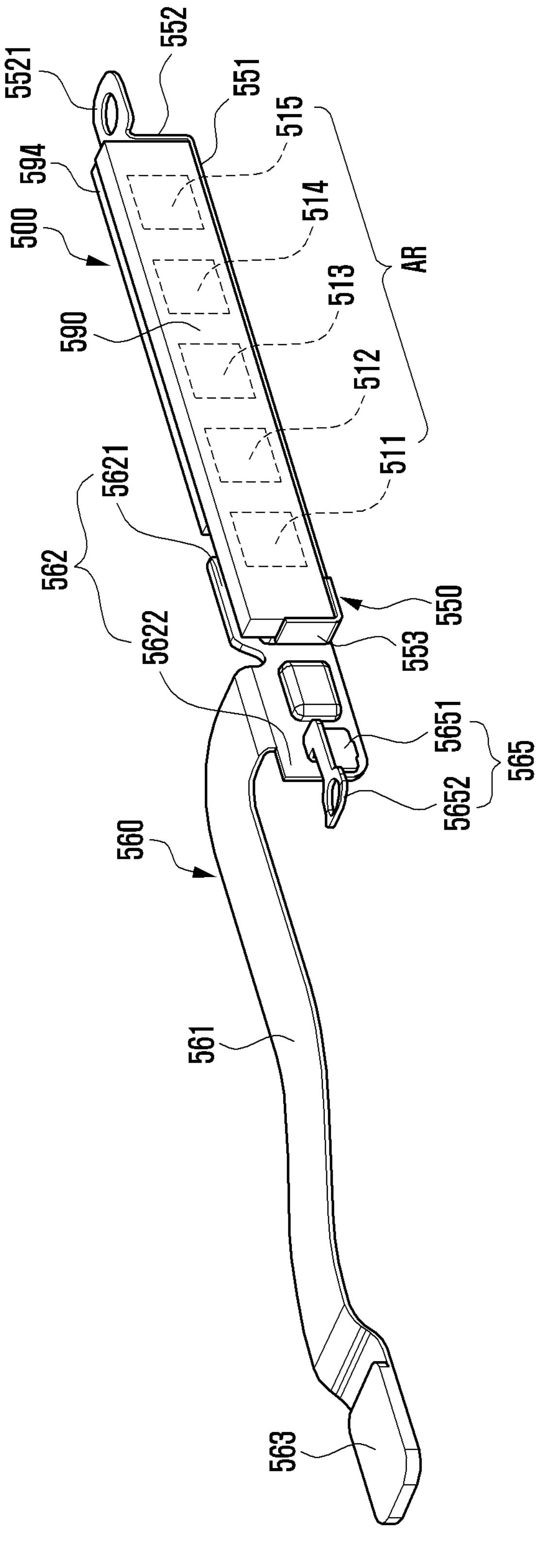
FIG. 6B is a view illustrating an antenna structure and an electrical connection member in a combined state according to an embodiment of the disclosure.

FIG. 6B is a view illustrating an antenna structure and an electrical connection member in a combined state according to an embodiment of the disclosure.

Referring to FIGS. 6A and 6B, the antenna structure 500 (e.g., antenna module) may include an array antenna AR including antenna elements 511, 512, 513, 514, and 515 and a substrate 590 on which the array antenna AR is disposed. According to an embodiment, the plurality of antenna elements 511, 512, 513, 514, and 515 may include conductive patches and/or conductive patterns disposed at designated intervals on the substrate 590. For example, the conductive patches may be used as a patch antenna. The conductive patterns may be used as a dipole antenna.

According to various embodiments, the substrate 590 may include a first substrate side 5901 directed in a designated direction, a second substrate side 5902 directed in an opposite direction to the first substrate side 5901, and a substrate lateral side 5903 surrounding a space between the first substrate side 5901 and the second substrate side 5902. According to an embodiment, the plurality of antenna elements 511, 512, 513, 514, and 515 may be exposed to the first substrate side 5901, may be disposed inside the substrate 590, or may be disposed to form a beam pattern toward the designated direction (e.g., x-axis direction of FIG. 4). According to an embodiment, the antenna structure 500 may be disposed in the inner space (e.g., inner space 4001 of FIG. 4) of the electronic device (e.g., electronic device 400 of FIG. 4) so that at least a part of the substrate lateral side 5903 of the substrate 590 corresponds to the housing (e.g., housing 410 of FIG. 4).

According to various embodiments, the antenna structure 500 may include a first wireless communication circuit 594 (e.g., wireless communication module 192 of FIG. 1) disposed on the second substrate side 5902 of the substrate 590. According to an embodiment, the plurality of antenna elements 511, 512, 513, 514, and 515 may be electrically connected to the first wireless communication circuit 594 through a wiring structure (not illustrated) inside the substrate 590. According to an embodiment, the first wireless communication circuit 594 may be configured to transmit or receive a wireless signal in the first frequency band through the array antenna AR. According to an embodiment, the first frequency band may include a frequency band (e.g., NR band) in the range of about 3 GHz to 100 GHz. In a certain embodiment, the first wireless communication circuit 594 may be disposed on the device substrate (e.g., device substrate 430 of FIG. 4) disposed at a location spaced apart from the substrate 590 in the inner space (e.g., inner space 4001 of FIG. 4) of the electronic device (e.g., electronic device 400 of FIG. 4), and may be electrically connected to the substrate 590 through the electrical connection member 560.

According to various embodiments, the plurality of antenna elements 511, 512, 513, 514, and 515 may include the first antenna element 511, the second antenna element 512, the third antenna element 513, the fourth antenna element 514, or the fifth antenna element 515 disposed at designated intervals on the first substrate side 5901 of the substrate 590 or in an area close to the first substrate side 5901 inside the substrate 590. According to an embodiment, the antenna elements 511, 512, 513, 514, and 515 may have substantially the same shape. Although it is illustrated and described that the antenna structure 500 according to an embodiment of the disclosure includes the array antenna AR including 5 antenna elements 511, 512, 513, 514, and 515, it is not limited thereto. For example, the antenna structure 500 may include one single antenna element, or may include 2, 3, 4, or 6 or more antenna elements as the array antenna AR. In a certain embodiment, the antenna structure 500 may include another array antenna (e.g., dipole array antenna) including a plurality of conductive patterns (e.g., dipole antenna) disposed on the substrate 590. In this case, the beam pattern of the other array antenna may be disposed to be formed in a different direction from the beam pattern direction of the array antenna AR (e.g., a vertical direction). In a certain embodiment, each of the antenna elements 511, 512, 513, 514, and 515 may include a pair of feeding parts, and may operate as a dual-polarization array antenna. In a certain embodiment, the antenna structure 500 may include a protection member (not illustrated) disposed on the second substrate side 5902 of the substrate 590 to at least partly surround the first wireless communication circuit 594. According to an embodiment, the protection member may include an epoxy resin. According to an embodiment, the antenna structure 500 may include a conductive shield layer (not illustrated) laminated on at least a side of the protection member. According to an embodiment, the conductive shield layer may shield that noise (e.g., DC-DC noise or interference frequency component) occurring in the antenna structure 500 spreads around. In a certain embodiment, the protection member and/or the conductive shield layer may be replaced by a shield can mounted on the substrate.

According to various embodiments, the electronic device (e.g., electronic device 400 of FIG. 4) may include the support bracket 550 fixed to at least a part of the conductive member (e.g., conductive member 420*a* of FIG. 4) of the housing (e.g., housing 410 of FIG. 4). According to an embodiment, the antenna structure 500 may be disposed to be supported by the support bracket 550. For example, at least a part of the substrate 590 of the antenna structure 500 may be fixed to the support bracket 550 through taping or bonding. In a certain embodiment, the support bracket 550 may at least partly come in contact with the conductive member (e.g., conductive member 420*a* of FIG. 4) of the housing (e.g., housing 410 of FIG. 4) to help stiffness reinforcement of the antenna structure 500, and may transfer heat generated from the antenna structure 500 to the conductive member (e.g., conductive member 420*a* of FIG. 4) of the housing 710 to effectively spread the heat. Accordingly, the support bracket 550 may be formed of a metal material (e.g., SUS, Cu, or Al) having designated thermal conductivity and tensile strength. According to an embodiment, the support bracket 550 may include a first support 551, a second support 552 bent from one end of the first support 551, and a third support 553 bent from the other end of the second support 552. According to an embodiment, the support bracket 550 may include a fourth support 554 bent from at least a part of substantially the center of the second support 552. According to an embodiment, the first support 551, the second support 552, and the third support 553 may be formed to support at least a part of the substrate lateral side 5903. According to an embodiment, the fourth support 554 may be formed to support at least a part of the second substrate side 5902. According to an embodiment, the support bracket 550 may include a first fastening part 5521 extending from the second support 552 and fastened to the conductive member (e.g., conductive member 420*a* of FIG. 4) of the housing (e.g., housing 410 of FIG. 4) through a fastening member (e.g., screw).

According to various embodiments, the electrical connection member 560 may include a flexible substrate (e.g., FPCB) or a flexible RF cable (FRC). According to an embodiment, the electrical connection member 560 may include a cable part 561 having a designated length, a substrate connection part 562 disposed at one end of the cable part 561 and electrically connected to the substrate 590 on at least a part of the second substrate side 5902 of the antenna structure 500, and a connector part 563 for being electrically connected to the device substrate (e.g., device substrate 430 of FIG. 4). In a certain embodiment, the substrate connection part 562 may be directly electrically connected to the first wireless communication circuit 594 disposed on the second substrate side 5902 of the substrate 590. According to an embodiment, the length of the cable part 561 may be determined in consideration of a separation distance between the antenna structure 500 and the device substrate (e.g., device substrate 430 of FIG. 4) disposed in the inner space (e.g., inner space 4001 of FIG. 4) of the electronic device (e.g., electronic device 400 of FIG. 4).

According to various embodiments, the substrate connection part 562 may include a first part 5621 fixed to the second substrate side 5902 of the substrate 590 of the antenna structure 500, and a second part 5622 extending from the first part 5621 and to which the conductive contact 565 is fixed. According to an embodiment, the first part 5621 may include a plurality of conductive terminals, and may be electrically connected to the substrate 590 of the antenna structure 500. According to an embodiment, the first part 5621 may be connected to the second substrate side 5902 through a board-to-board (B2B) connector. According to a certain embodiment, the first part 5621 may be fixed to the second substrate side 5902 through an electrical connection process such as soldering, conductive bonding, or conductive taping. According to an embodiment, the conductive contact 565 is made of a metal material (e.g., SUS), and may include a fixing part 5651 fixed to the second part 5622 and a second fastening part 5652 extending (or branching) from the fixing part 5651 and fixed to at least a part of the conductive part (e.g., conductive part 4221 of FIG. 4) of the housing (e.g., housing 410 of FIG. 4). According to an embodiment, the conductive contact 565 may be fixed to the conductive part (conductive part 4221 of FIG. 4) of the housing (e.g., housing 410 of FIG. 4) through the fastening member (e.g., fastening member S of FIG. 7) (e.g., screw). According to an embodiment, the substrate connection part 562 may include a rigid structure at least partly, and may provide a stiffness structure when being fixed to the second substrate side 5902. For example, the substrate connection part 562 may have a combined structure of the flexible substrate and a polymer member of a PC material. According to an embodiment, the antenna structure 500 may be fixed to the housing (e.g., housing 410 of FIG. 4) of the electronic device (e.g., electronic device 400 of FIG. 4) through the first fastening part 5521 formed on the second support 552 of the support bracket 550 and the second fastening part 5652 of the conductive contact 565 disposed at a location facing the first fastening part 5521 and disposed on the second part 5622 of the substrate connection part 562.

According to various embodiments, the conductive part (e.g., conductive part 4221 of FIG. 4) disposed through the non-conductive part (e.g., non-conductive part 4223 of FIG. 4) may be electrically connected to the device substrate (e.g., device substrate 430 of FIG. 4) through the electrical connection member 560. For example, the conductive part (e.g., conductive part 4221 of FIG. 4) may be electrically connected to the device substrate (e.g., device substrate 430 of FIG. 4) through the conductive contact 565 disposed on the substrate connection part 562 of the electrical connection member 560. Accordingly, the second wireless communication circuit (e.g., wireless communication module 192 of FIG. 1) disposed on the substrate (e.g., device substrate 430 of FIG. 4) may be configured to transmit or receive the wireless signal in the second frequency band through the conductive part (e.g., conductive part 4221 of FIG. 4). According to an embodiment, the second frequency band may include a frequency band in the range of about 600 MHz to 6000 MHz. In a certain embodiment, the conductive part (e.g., conductive part 4221 of FIG. 4) may be disposed in the inner space (e.g., inner space 4001 of FIG. 4) of the electronic device (e.g., electronic device 400 of FIG. 4), and may be replaced by at least one conductive pattern used as the antenna radiator 500. The conductive pattern may include a laser direct structuring (LDS) pattern formed on a dielectric structure (e.g., antenna carrier) disposed in the inner space (e.g., inner space 4001 of FIG. 4) of the electronic device (e.g., electronic device 400 of FIG. 4). According to another embodiment, the conductive part 4221 may be electrically connected to the conductive pattern (e.g., antenna pattern or dummy pattern) disposed in the inner space (e.g., inner space 4001 of FIG. 4) of the electronic device (e.g., electronic device 400 of FIG. 4) to help extending of the electrical length.

Figure 7:
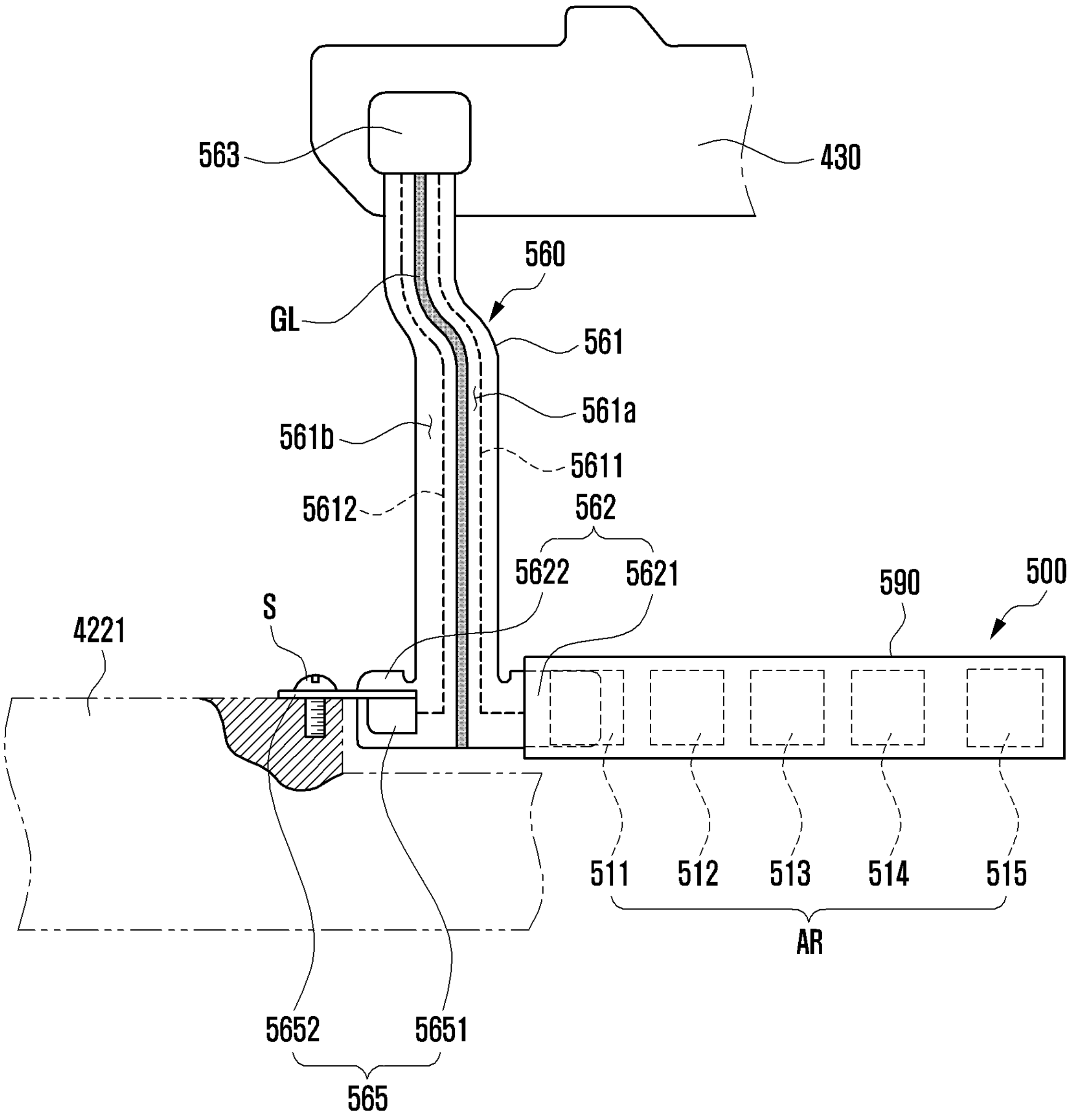
FIG. 7 is a view illustrating an electrical connection structure of an antenna structure and a conductive part, and an electrical connection member according to an embodiment of the disclosure.

FIG. 7 is a view illustrating an electrical connection structure of an antenna structure and a conductive part, and an electrical connection member according to an embodiment of the disclosure.

Referring to FIG. 7, the electrical connection member 560 may include a cable part 561 having a designated length, a substrate connection part 562 disposed at one end of the cable part 561 and electrically connected to the substrate 590 on at least a part of the second substrate side 5902 of the antenna structure 500, and a connector part 563 for being electrically connected to the device substrate 430. According to an embodiment, the electrical connection member 560 may include a plurality of electrical paths 5611 and 5612 connected from the substrate connection part 562 to the connector part 563 through the cable part 561. According to an embodiment, the plurality of electrical paths 5611 and 5612 may include at least one first electrical path 5611 (e.g., signal line and/or ground line) connected from the first part 5621 of the substrate connection part 562 connected to the antenna structure 500 to the connector part 563 through the cable part 561, and at least one second electrical path 5612 (e.g., signal line and/or ground line) connected from the second part 5622 of the substrate connection part 562, to which the conductive contact 565 connected to the conductive part 4221 through the fastening member S is fixed, to the connector part 563 through the cable part 561. According to an embodiment, the at least one first electrical path 5611 may be disposed through a first area 561*a* of the cable part 561. According to an embodiment, the at least one second electrical path 5612 may be disposed through a second area 561*b* separated from the first area 561*a* of the cable part 561. According to an embodiment, the electrical connection member 560 may be electrically shielded through a ground line GL to avoid mutual interference between the at least one first electrical path 5611 and the at least one second electrical path 5612. According to an embodiment, the ground line GL may electrically shield the first part 5621 and the second part 5622 of the substrate connection part 562 from each other.

Figure 8:
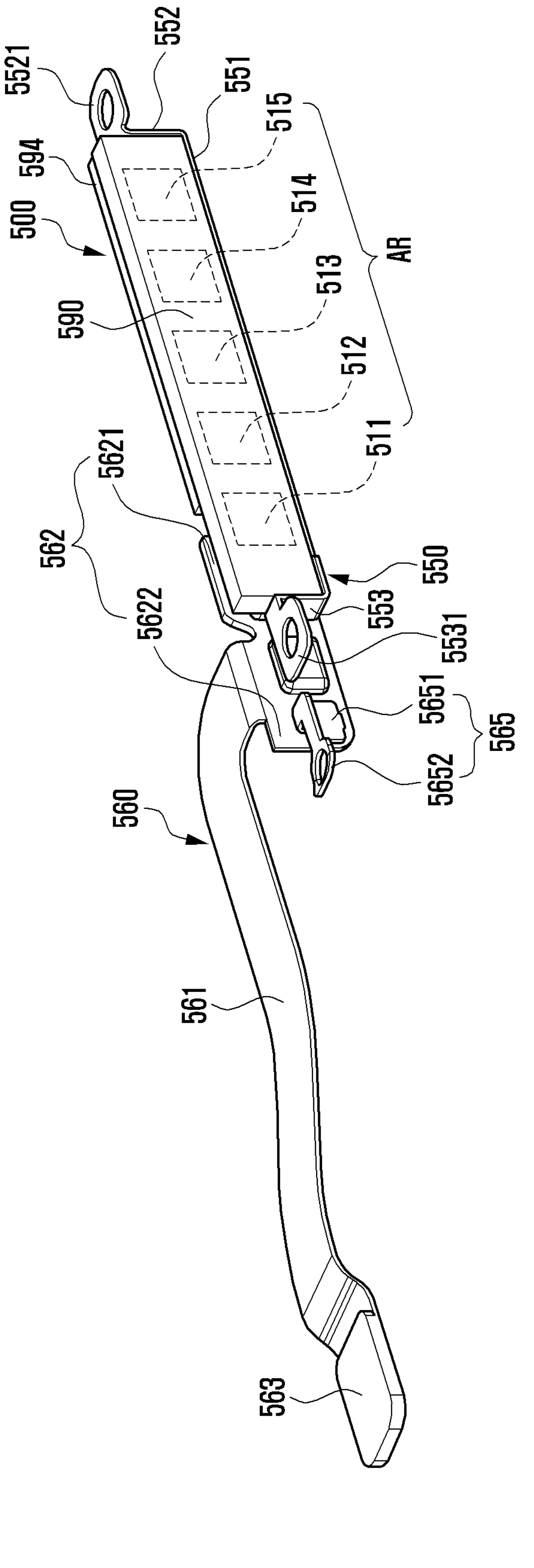
FIG. 8 is a view illustrating an antenna structure and an electrical connection member in a combined state according to an embodiment of the disclosure.

FIG. 8 is a view illustrating an antenna structure and an electrical connection member in a combined state according to an embodiment of the disclosure.

Referring to FIG. 8, the same reference numerals are given to substantially the same constituent elements as those of FIG. 6A, and the detailed explanation thereof may be omitted.

Referring to FIG. 8, the antenna structure 500 may be fixed to the housing (e.g., housing 410 of FIG. 4) of the electronic device (e.g., electronic device 400 of FIG. 4) through the first fastening part 5521 of the support bracket 550 and the second fastening part 5652 of the conductive contact 565 fixed to the second part 5622 of the substrate connection part 562 of the electrical connection member 560 fixed to the substrate 590. In a certain embodiment, since it is difficult for the part fixed through the second fastening part 5652 to maintain the equivalent level of the rigid support structure as compared with the first fastening part

5521, or the conductive contact 565 is randomly separated from the substrate 590 due to an external impact, the operation of the antenna structure 500 may not be possible.

According to an embodiment of the disclosure, the support bracket 550 may extend from the third support 553, and may include a third fastening part 5531 fixed to the conductive member (e.g., conductive member 420*a* of FIG. 4) of the housing (e.g., housing 410 of FIG. 4). According to an embodiment, the third fastening part 5531 may be fixed to the conductive member (e.g., conductive member 420*a* of FIG. 4) through a fastening means (e.g., fastening means S of FIG. 7) such as a screw. Accordingly, the antenna structure 500 can be firmly fixed to the conductive member (e.g., conductive member 420*a* of FIG. 4) through the support bracket 550 including the first fastening part 5521 and the third fastening part 5531, and the phenomenon that the conductive contact 565 of the substrate connection part 562 is separated or damaged from the substrate 590 due to the external impact of the electronic device (e.g., electronic device 400 of FIG. 4) can be reduced.

According to various embodiments, an electronic device (e.g., mobile electronic device 200 of FIG. 4) may include a housing (e.g., housing 410 of FIG. 4) including a conductive part (e.g., conductive part 4221 of FIG. 4); a device substrate (e.g., device substrate 430 of FIG. 4) disposed in an inner space (e.g., inner space 4001 of FIG. 4) of the housing; an antenna structure (e.g., antenna structure 500 of FIG. 4) disposed in the inner space so as to form a directional beam, the antenna structure including a substrate (e.g., substrate 590 of FIG. 4), an array antenna (e.g., array antenna AR of FIG. 4) including a plurality of antenna elements (e.g., antenna elements 511, 512, 513, 514, and 515 of FIG. 4) disposed on the substrate; and a support bracket (e.g., support bracket 550 of FIG. 4) disposed to support the substrate; an electrical connection member (e.g., electrical connection member 560 of FIG. 4) electrically connecting the substrate and the device substrate to each other; a conductive contact (e.g., conductive contact 565 of FIG. 6A) electrically connecting the electrical connection member and the conductive part to each other; a first wireless communication circuit (e.g., first wireless communication circuit 594 of FIG. 6A) disposed in the inner space of the housing and configured to transmit or receive a first wireless signal in at least one first frequency band through the antenna structure; and a second wireless communication circuit (e.g., wireless communication module 192 of FIG. 1) disposed on the device substrate, and configured to transmit or receive a second wireless signal in at least one second frequency band through the conductive part.

According to various embodiments, the electrical connection member may include a cable part having a designated length; a substrate connection part disposed at one end of the cable part, and including a first part electrically connected to the substrate and a second part extending from the first part and to which the conductive contact is fixed; and a connector part disposed at the other end of the cable part and electrically connected to the device substrate.

According to various embodiments, the electrical connection member may include at least one first electrical path electrically connected from the connector part to the substrate through the cable part and the first part; and at least one second electrical path electrically connected from the connector part to the conductive contact through the cable part and the second part.

According to various embodiments, the electrical connection member may include a shield line for shielding the at least one first electrical path and the at least one second electrical path.

According to various embodiments, the shield line may include a ground line.

According to various embodiments, the first part may be fixed to the substrate through at least one of a board-to-board (B2B) connector, soldering, conductive bonding, or conductive taping.

According to various embodiments, the support bracket may include a first support part supporting a part of a side of the substrate; a second support part bent from one end of the first support part and supporting a part of the side of the substrate; a third support part bent from the other end of the first support part and supporting a part of the side of the substrate; and a first fastening part extending from the second support part and fixed to at least a part of the housing through a fastening member.

According to various embodiments, the conductive contact may include a fixing part fixed to the second part; and a second fastening part extending from the fixing part and fixed to the conductive part.

According to various embodiments, the conductive contact may be disposed at a location facing the first fastening part.

According to various embodiments, the electronic device may further include a third fastening part extending from the third support part and fixed to at least a part of the housing through the fastening member.

According to various embodiments, the fixing part may be fixed to the substrate through at least one of soldering, conductive bonding, or conductive taping.

According to various embodiments, the second fastening part may be fixed to the conductive part in a manner that the second fastening part is fastened to the conductive part through the fastening member.

According to various embodiments, the conductive part may be disposed to be electrically separated through a non-conductive part disposed in at least a part of the housing.

According to various embodiments, the electronic device may further include a rigid structure disposed in the inner space, wherein the non-conductive part is disposed at a location that does not overlap an edge of the rigid structure as seen from an outside of the housing.

According to various embodiments, the rigid structure may include at least one battery.

According to various embodiments, the first wireless communication circuit may be disposed on the substrate.

According to various embodiments, the wireless communication circuit may be disposed on the device substrate.

According to various embodiments, the first frequency band may include a frequency band in a range of 3 GHz to 100 GHz, and the second frequency band may include a frequency band in a range of 600 MHz to 6000 MHz.

According to various embodiments, the housing may include a front cover; a rear cover directed in an opposite direction to the front cover; and a lateral member surrounding a space between the front cover and the rear cover, wherein the lateral member is formed through a conductive member and a non-conductive member combined with the conductive member, and the antenna structure is disposed so as to form a beam pattern in an outside direction directed by the lateral member through the non-conductive member.

According to various embodiments, the conductive part may be formed through at least a part of the conductive member and may be disposed at a location that does not overlap the antenna structure as seen from an outside of the lateral member.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:

a housing comprising a conductive part;

a device substrate disposed in an inner space of the housing;

an antenna structure disposed in the inner space so as to form a directional beam, the antenna structure comprising:

a substrate, an array antenna comprising a plurality of antenna elements disposed at the substrate, and a support bracket disposed to support the substrate, an electrical connection member electrically connecting the substrate and the device substrate to each other;

a conductive contact electrically connecting the electrical connection member and the conductive part to each other;

a first wireless communication circuit disposed on the substrate and configured to transmit or receive a first wireless signal in at least one first frequency band through the antenna structure; and a second wireless communication circuit disposed on the device substrate, and configured to transmit or receive a second wireless signal in at least one second frequency band through the conductive part, wherein a portion of the conductive contact is fixed to the electrical connection member and another portion of the conductive contact is fixed to the conductive part of the housing, and wherein the conductive part of the housing is electrically connected to the second wireless communication circuit disposed on the device substrate through the conductive contact and the electrical connection member.

2. The electronic device of claim 1, wherein the electrical connection member comprises:

a cable part having a designated length;

a substrate connection part disposed at one end of the cable part, and comprising a first part electrically connected to the substrate and a second part extending from the first part and to which the conductive contact is fixed; and a connector part disposed at another end of the cable part and electrically connected to the device substrate.

3. The electronic device of claim 2, wherein the electrical connection member comprises:

at least one first electrical path electrically connected from the connector part to the substrate through the cable part and the first part; and at least one second electrical path electrically connected from the connector part to the conductive contact through the cable part and the second part.

4. The electronic device of claim 3, wherein the electrical connection member comprises a shield line for shielding the at least one first electrical path and the at least one second electrical path.

5. The electronic device of claim 4, wherein the shield line comprises a ground line.

6. The electronic device of claim 2, wherein the first part is fixed to the substrate through at least one of a board-to-board (B2B) connector, soldering, conductive bonding, or conductive taping.

7. The electronic device of claim 2, wherein the support bracket comprises:

a first support part supporting a part of a side of the substrate;

a second support part bent from one end of the first support part and supporting a part of the side of the substrate;

a third support part bent from another end of the first support part and supporting a part of the side of the substrate; and a first fastening part extending from the second support part and fixed to at least a part of the housing through a fastening member.

8. The electronic device of claim 7, wherein the conductive contact comprises:

a fixing part fixed to the second part; and a second fastening part extending from the fixing part and fixed to the conductive part.

9. The electronic device of claim 8, wherein the conductive contact is disposed at a location facing the first fastening part.

10. The electronic device of claim 9, further comprising a third fastening part extending from the third support part and fixed to at least a part of the housing through the fastening member.

11. The electronic device of claim 8, wherein the fixing part is fixed to the substrate through at least one of soldering, conductive bonding, or conductive taping.

12. The electronic device of claim 8, wherein the second fastening part is fixed to the conductive part in a manner that the second fastening part is fastened to the conductive part through the fastening member.

13. The electronic device of claim 1, wherein the conductive part is disposed through at least one non-conductive part disposed in at least a part of the housing.

14. The electronic device of claim 13, further comprising:

a rigid structure disposed in the inner space, wherein the at least one non-conductive part is disposed at a location that does not overlap an edge of the rigid structure as seen from an outside of the housing in plan view.

15. The electronic device of claim 14, wherein the rigid structure comprises at least one battery.

16. The electronic device of claim 1, wherein the first wireless communication circuit is disposed on the substrate.

17. The electronic device of claim 1, wherein the wireless communication circuit is disposed on the device substrate.

18. The electronic device of claim 1, wherein the first frequency band comprises a frequency band in a range of about 3 GHz to 100 GHz, and wherein the second frequency band comprises a frequency band in a range of about 600 MHz to 6000 MHz.

19. The electronic device of claim 1, wherein the housing comprises:

a front cover;

a rear cover directed in an opposite direction to the front cover; and a lateral member surrounding a space between the front cover and the rear cover, wherein the lateral member is formed through a conductive member and a non-conductive member combined with the conductive member, and wherein the antenna structure is disposed so as to form a beam pattern in an outside direction directed by the lateral member through the non-conductive member.

20. The electronic device of claim 19, wherein the conductive part is formed through at least a part of the conductive member, and wherein the conductive part is disposed at a location that does not overlap the antenna structure as seen from an outside of the lateral member.

* * * * *